L. STEELMAN.
ANNEALING FURNACE OR LEER.
APPLICATION FILED DEC. 6, 1915.
1,178,550.
Patented Apr. 11, 1916.
4 SHEETS—SHEET 1.
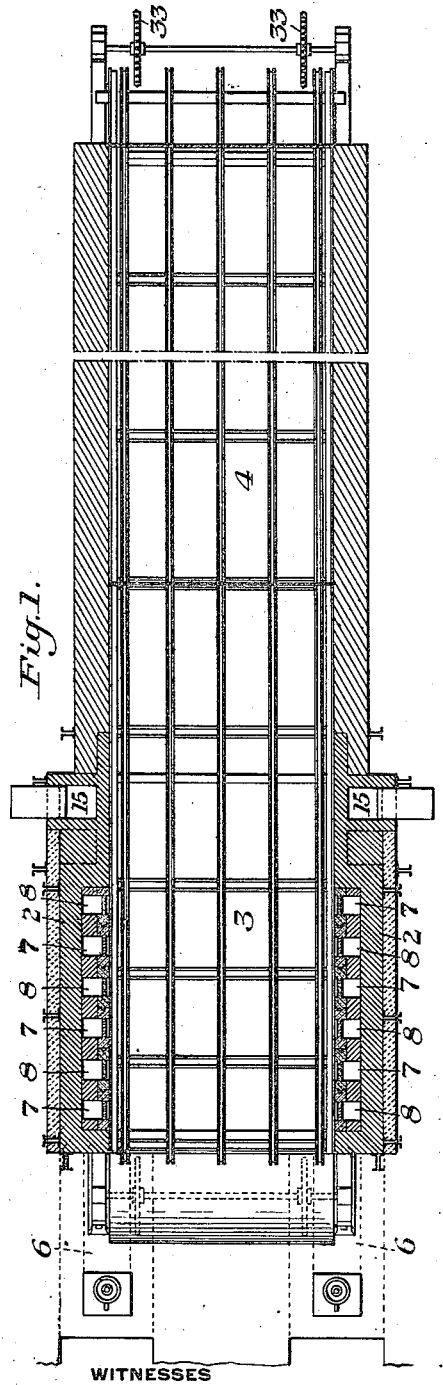
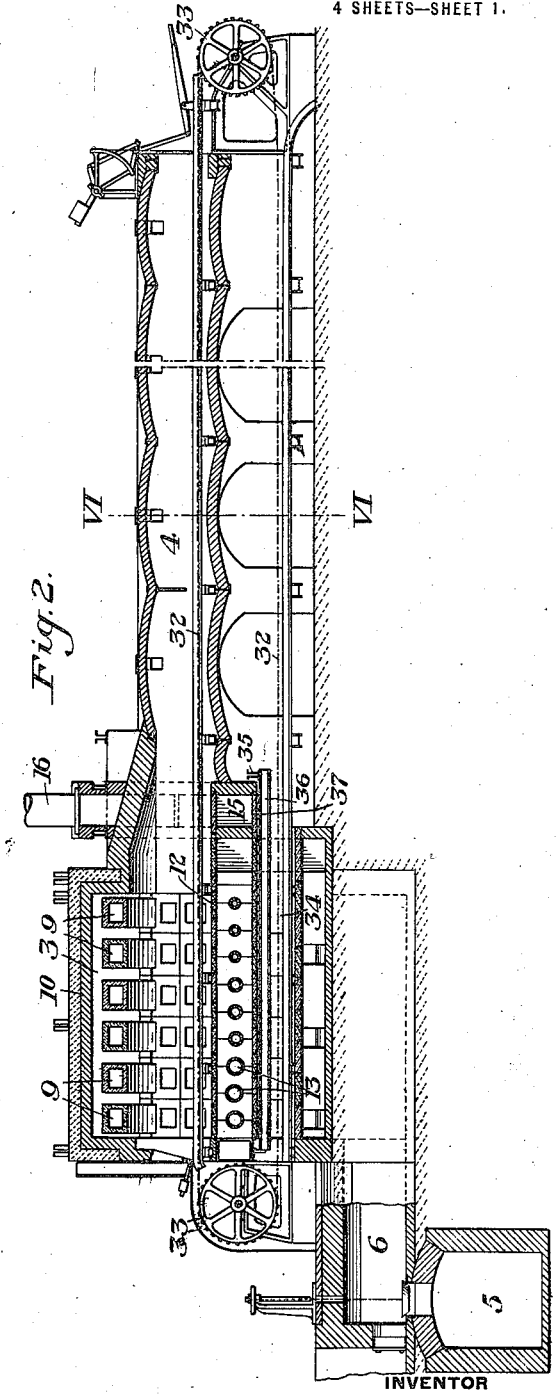
WITNESSES
INVENTOR

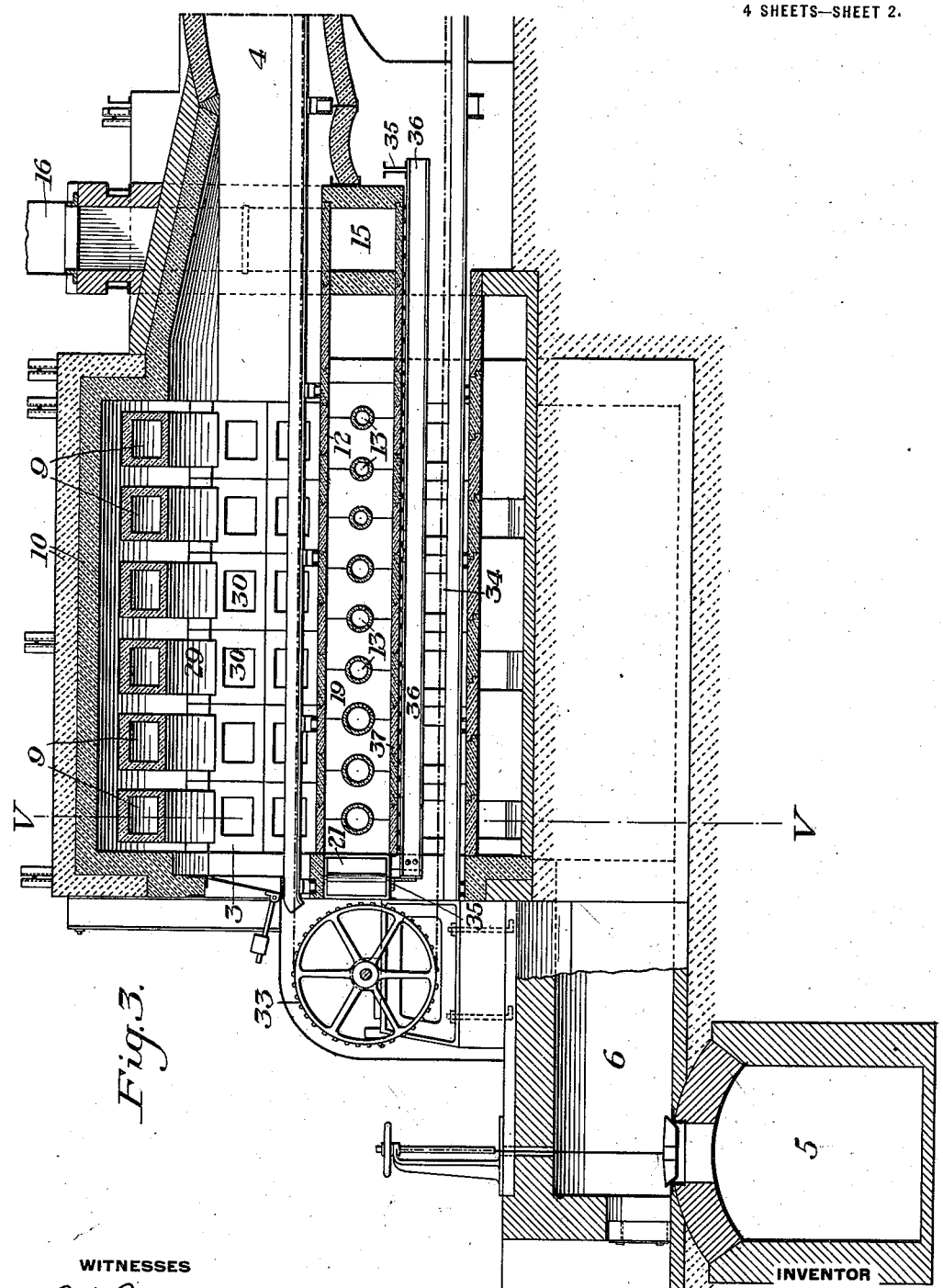

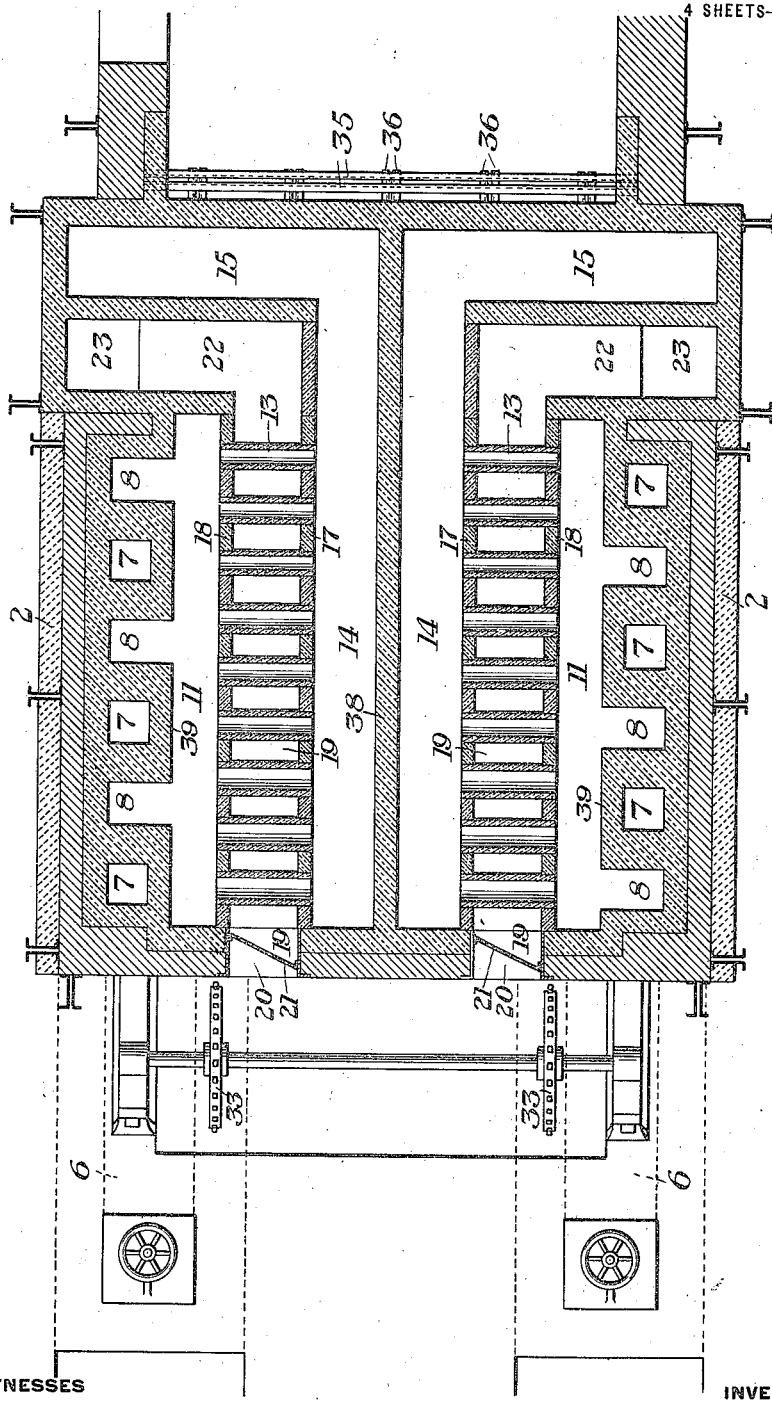

L. STEELMAN.
ANNEALING FURNACE OR LEER.
APPLICATION FILED DEC. 6, 1915.
1,178,550.
Patented Apr. 11, 1916.
4 SHEETS—SHEET 4.
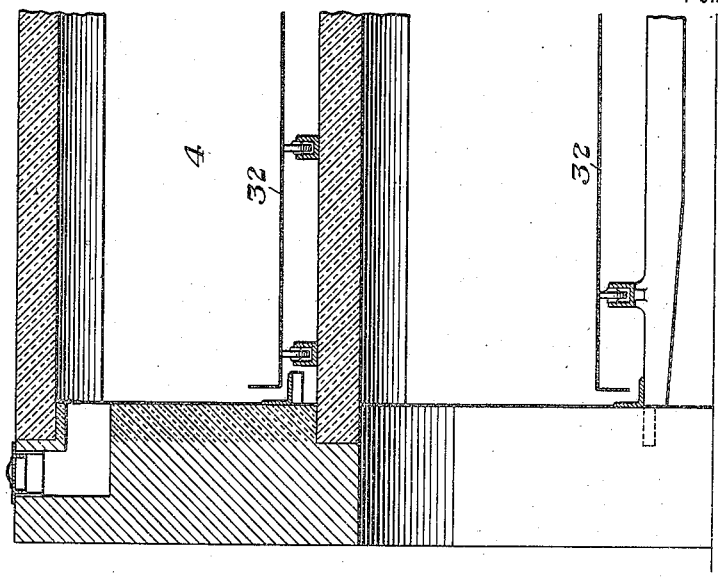
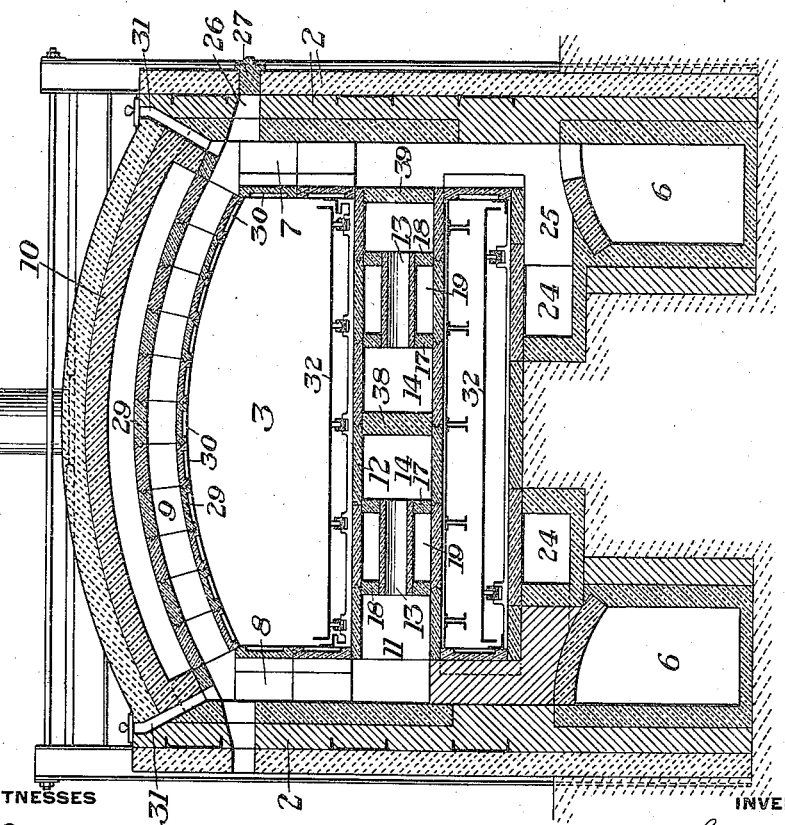

UNITED STATES PATENT OFFICE.

LEWIS STEELMAN, OF MILLVILLE, NEW JERSEY.

ANNEALING-FURNACE OR LEER.

1,178,550.

Specification of Letters Patent.  Patented Apr. 11, 1916.

Application filed December 6, 1915. Serial No. 65,186.

*To all whom it may concern:*

Be it known that I, LEWIS STEELMAN, a citizen of the United States, residing at Millville, Cumberland county, New Jersey, have invented a new and useful Improvement in Annealing-Furnaces or Leers, of which the following is a full, clear, and exact description, reference being had to the accompanying drawings, forming part of this specification, in which—

Figure 1 is a horizontal section, with a portion broken away, of a leer embodying my invention. Fig. 2 is a longitudinal vertical section of the same, also partly broken away. Fig. 3 is a vertical section of a portion of the leer on a somewhat larger scale. Fig. 4 is a horizontal section taken through the recuperators, and Figs. 5 and 6 are transverse sections taken, respectively, on the lines V—V of Fig. 3 and VI—VI of Fig. 2.

My invention has relation to annealing furnaces or leers, and particularly to glass leers of the continuous type.

The present invention is also more especially an improvement upon the Steelman leers, for which I have filed certain pending applications for Letters Patent of the United States.

The present invention has for its object the provision of a continuous leer of the Steelman type, having a novel arrangement of its recuperators with respect to the endless conveyer. Also to improve the mechanical construction and arrangement of certain parts of the leer structure.

Novel features of the leer shown and described herein, but not specifically claimed, form the subject matter of my copending application Serial No. 873,021, filed November 19, 1914.

In the accompanying drawings, which illustrate a preferred embodiment of my invention, the numeral 2 designates the outer brickwork of the leer which incloses the annealing chamber 3 and the tunnel 4 forming a longitudinal extension of the discharge end portion of the chamber 3.

5 designates the main gas or fuel conduit arranged in the base of the structure, and which is provided with the branch conduits 6, two of which are employed in connection with each leer. This particular arrangement of the gas supply flues is not, however, essential, and any suitable system may be employed. Leading upwardly from the branch conduits 6 at each side of the leer are a plurality of spaced vertical flues 7 which extend up within the chamber 3. The flues 7 at one side of the structure are in staggered or alternating relation to the similar flues 7 at the opposite side of the structure. Intermediate the flues 7 at each adjacent side are the vertical flues 8, each flue 8 being connected at its upper end with the upper end of a flue 7 at the opposite side by means of an arched transverse flue 9 also located within the chamber 3, below the roof arch 10 thereof. The flues 8 open at their lower end portions into a longitudinal passage 11 which extends partially underneath the floor 12 of the chamber 3.

13 designate recuperator passages which are arranged below the floor 12, there being one series of these passages at each side of the center line of the structure, and each set of passages opening at one end to one of the passages 11. At the other end the recuperator passages open into longitudinal flues 14, which at their forward ends have laterally extending flues 15 leading to the stack 16. The recuperator passages 13 may be conveniently formed of tiles which are supported in the walls 17 and 18; and these walls may in turn be composed of sectional tiles, as best shown in Fig. 3. The space 19 between each pair of walls 17 and 18 has an air inlet 20 at the front end, as best shown in Fig. 4, the inlet openings being each controlled by a suitable damper 21. The spaces 19 at the rear ends connect with the laterally and downwardly extending passages 22 and 23, the latter leading downwardly into the forward ends of the longitudinally extending air chambers 24. Each of these air chambers has a series of lateral flues 25, each of which communicates with one of the vertical flues 7 shortly above the branch gas conduit 6.

From the foregoing description and from the drawings, it will be observed that there are two series of flues extending through the chamber 3, the flues of the two series alternating with each other, and each flue of one series being connected at one end with one of the air chambers 24 and one of the branch gas conduits 6; while each flue of the other series is similarly connected at the other side of the furnace with the other air chamber 24 and branch gas conduit 6. The other end of each flue is connected to the stack 16 through the recuperator passages 13 and the passages 14 and 15.

In the operation of the leer, combustion takes place at each side in the lower portions of the flues 7, and the hot products of combustion pass upwardly through said flues, through the transverse flues 9, thence down through the vertical flues 8 at the opposite side, and thence through the recuperators to the stack, the several recuperator passages 13 at each side of the leer being in multiple. In this way separate currents of the heating medium are passed in opposite directions through adjacent flues within the heating chamber, thus equalizing the temperature of the chamber at both sides. Inasmuch as the heating flues are arranged within the chamber itself, a maximum area of heating surface is provided. At the same time, the outgoing waste gases, in passing through the recuperators, preheat the air which is required to support combustion in the flues 7.

Each of the flues 7 is preferably provided at its upper end portion with a lateral opening 26 which may normally be closed by a plug 27. These openings provide means through which a suitable instrument may be inserted to clean the arch flues 9. The plugs 27 may also be made to act as dampers, whereby to a certain extent the temperature in different flues may be separately regulated. It will also be noted that inasmuch as each system or series of flues has its own stack connection, the heating action of each system of flues may be independently regulated by any usual or suitable means.

The upper portions of the flues 7 and the arch flues 9 may be conveniently formed of interfitting tubular tiles 29, having paneled faces 30 which reduce the thickness of heat radiating walls of the tiles and also increase the area of their radiating surfaces. I may also provide the openings 31, which communicate with the upper portions of the flues 7 and 8, and through which suitable cleaning implements may be introduced.

32 designates the endless conveyer which carries the articles to be annealed through the annealing chamber 3 and the tunnel 4. This conveyer may be supported and driven by sprocket wheels 33. The upper or working portion of the conveyer travels through the lower portion of the chamber 3, while the lower or return portion thereof passes below the tunnel 4 and through an open-end chamber 34 which is located below the recuperators and between the recuperators and the longitudinal air chambers 24, before referred to. This arrangement of the return portion of the conveyer constitutes one of the features of my present improvement. By placing the recuperator between the two branches of the conveyer, the recuperator is placed directly underneath the chamber 3 so that its heat is immediately under the glassware on the upper branch of the conveyer. In this manner the temperature throughout the chamber 3 is substantially equalized, and the recuperator is not only made effective to preheat the air required for combustion, but is also utilized to heat the lower portion of the annealing chamber. At the same time the gas conduits and air chambers may be conveniently arranged below the lower branch of the carrier, thus avoiding the necessity of carrying the structure as deeply in the ground as would be necessary if the recuperator were placed below both branches of the conveyer. The present construction also obviates the presence of extensive void spaces between the two branches of the conveyer, which is objectionable. Where such spaces are present, it is very difficult to avoid objectionable air currents and to obtain a proper heating action.

The present construction, as will be seen, provides for a circulation of the products of combustion around practically the entire annealing chamber, thus giving not only an extremely effective heating of and heat distribution within said chamber, but permitting the presence within the chamber and within the tunnel 4 of a quiescent atmosphere. As there are no products of combustion to be carried out through the tunnel, the presence of drafts in the tunnel is obviated, and the construction may be readily made such as to insure the proper uniform gradual cooling of the annealed articles.

Another feature of my invention consists in the construction of that portion of the leer which supports the floor of the annealing chamber, the recuperators, and the chamber 34 for the return branch of the conveyer.

In accordance with my invention, I provide the transversely extending beams 35 at opposite ends of the recuperators, and from these beams I suspend a plurality of parallel longitudinal beams 36 which support the tiles 37 which form the floor separating the chamber 34 from the recuperator and flues immediately above the chamber 34. The side walls 17 and 18 of the recuperator chambers are supported directly on these floor tiles and are also made to directly support the floor of the chamber 3.

The central partition wall 38 between the two stack flues 14, and the side walls 39 also rest directly upon the floor tiles 37 and further support the floor of the chamber 3. The tiles forming the upper portion of the flues 7, and the flues 8, are also partially supported on the floor of the chamber 3 and directly over the side walls 39.

The construction just described is a very satisfactory one, since it is not only simple and readily built, but it also supports the central portions of the leer structure entirely between and within the side walls of the structure, thus avoiding the necessity for carrying any supporting beams or other members laterally through the flues.

The advantages of my invention will be readily apparent from the foregoing description. I do not, however, desire to limit myself to the particular construction, arrangement and combination of the parts which I have herein shown and described, since these may be changed in various ways without departing from the spirit and scope of my invention as defined in the appended claims. Thus, the heat flues, instead of consisting of interfitting tiles of the form shown, may be constructed in various ways; the character and details of the recuperators may be changed, and various other changes may be made.

I claim:

1. An annealing furnace or leer of the continuous type, having an endless conveyer, one branch of which passes through the annealing chamber, and the return branch of which passes below said chamber, and air preheating means located between the two branches of the conveyer, and underneath and in heating relation to the floor of the annealing chamber, substantially as described.

2. An annealing furnace or leer of the continuous type, comprising an annealing chamber having two series of heating flues extending therethrough, air preheating means connected with the outlet side of the flues of each series, and an endless conveyer having its work portion passing through the annealing chamber and its return portion passing below the air preheating means, substantially as described.

3. An annealing furnace or leer of the continuous type, comprising an annealing chamber having two series of heat circulating flues extending therethrough, means for circulating a heating medium through one series of said flues in one direction, and through the other series of flues in the opposite direction, recuperators connected with the outlet sides of each series of flues and arranged directly below the floor of the heating chamber, and an endless conveyer for the articles to be annealed, the working portion of said conveyer passing through the annealing chamber and the return portion of the conveyer passing below the recuperators, substantially as described.

4. An annealing furnace or leer of the continuous type, comprising an annealing chamber having two series of heat circulating flues extending therethrough, means for circulating a heating medium through one series of said flues in one direction, and through the other series of flues in the opposite direction, recuperators connected with the outlet sides of each series of flues and arranged directly below the floor of the heating chamber, and an endless conveyer for the articles to be annealed, the working portion of said conveyer passing through the annealing chamber and the return portion of the conveyer passing below the recuperators, together with air and gas supply conduits located below the return portion of the conveyer, substantially as described.

5. An annealing furnace or leer of the continuous type, having an endless conveyer, and recuperators arranged below its annealing chamber between the upper and lower portions of the conveyer, substantially as described.

6. An annealing furnace or leer of the continuous type, having an annealing chamber, recuperators below said chamber, and supporting means for the floor of the chamber and for the recuperators, said supporting means being carried at points outside of the walls of said chamber, substantially as described.

7. An annealing furnace or leer of the continuous type, comprising an annealing chamber, a heating flue system for said chamber, recuperators connected with the heating flue system and arranged below the floor of the chamber, an endless conveyer having its upper and lower portions at opposite sides of the recuperators, and supporting means for the interior portions of the leer structure, including the recuperators, arranged within the side walls of the furnace and below the heating flue system, substantially as described.

8. An annealing furnace or leer of the continuous type, having an annealing chamber, recuperators below the annealing chamber, a conveyer passage below the recuperators, and longitudinal supporting members within said passage for the recuperators and portions of the annealing chamber, substantially as described.

9. An annealing furnace or leer of the continuous type, having an annealing chamber, vertically arranged heat circulating flues within opposite side portions of said chamber, an endless conveyer having its upper portion extending through said chamber between the heating flues, recuperators below the annealing chamber and between the two branches of the conveyer, and supporting means for the annealing chamber and recuperators arranged below the recuperators and between the vertical portions of the heating flues, substantially as described.

10. An annealing furnace or leer of the continuous type, having an annealing chamber, flues arranged to radiate heat into the lateral and upper portions of said chamber, recuperator means arranged directly below the floor of said chamber and arranged to heat the same, said means being connected with the outlets of the said flues, and an endless conveyer having its working branch extending through the annealing chamber, and its return branch extending below the recuperator, substantially as described.

11. An annealing furnace or leer of the continuous type, having an endless conveyer, and recuperators arranged below its annealing chamber between the upper and lower portions of the conveyer, said recuperators and conveyer being located above the floor level, substantially as described.

12. An annealing furnace or leer of the continuous type, having heat radiating flues for radiating heat into its upper and lateral portions, recuperator means directly below the floor of the annealing chamber and in heating relation thereto, said recuperator means having connections with the outlet ends of said flues, said means and connections being arranged to produce a substantially horizontal flow of the waste gases from the flues through the recuperator means, substantially as described.

13. An annealing furnace or leer of the continuous type, having two sets of heat radiating flues passing through its annealing chamber, two recuperators located below the floor of said chamber and in heating relation thereto, each recuperator having connections with the outlet ends of one set of said flues, an endless conveyer having its working portion passing through the annealing chamber, and its return portion passing below the recuperators, and separate means for controlling the action of each set of flues, substantially as described.

14. An annealing furnace or leer of the continuous type, having two sets of heat radiating flues passing through its annealing chamber, two recuperators located below the floor of said chamber and in heating relation thereto, each recuperator having connections with the outlet ends of one set of said flues, an endless conveyer having its working portion passing through the annealing chamber, and its return portion passing below the recuperators, separate means for controlling the entrance of air to each recuperator, and separate controllable stack connections for each recuperator, substantially as described.

15. An annealing furnace or leer, having an annealing chamber, and recuperator means below and in heating relation to the floor of said chamber, and a plurality of supporting members for the annealing chamber and recuperators, said supporting members being carried at points outside the walls of the annealing chamber and recuperators, substantially as described.

16. An annealing furnace or leer, having an annealing chamber, a recuperator below the floor of said chamber and in heating relation thereto, and a plurality of supporting members for the annealing chamber and the recuperator, said members extending longitudinally below the recuperator and having supporting means located outside the walls of said chamber, substantially as described.

17. An annealing furnace or leer, having an annealing chamber, and a recuperator directly below the said chamber and in heating relation to the floor thereof, there being heating flues extending through the annealing chamber and connecting with the recuperator, and supporting means for the annealing chamber and recuperator arranged below the recuperator between the said flues, said supporting means being carried from points outside of the walls of the annealing chamber, substantially as described.

In testimony whereof, I have hereunto set my hand.

LEWIS STEELMAN.

Witnesses:
J. ROY OLIVER,
HENRY O. BURT.